United States Patent
Moriya (10) Patent No.: US 7,483,055 B2
(45) Date of Patent: Jan. 27, 2009

(54) IMAGE DEFLECTION CORRECTION APPARATUS

(75) Inventor: Chikatsu Moriya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 550 days.

(21) Appl. No.: 11/334,410

(22) Filed: Jan. 19, 2006

(65) Prior Publication Data
US 2006/0176372 A1 Aug. 10, 2006

(30) Foreign Application Priority Data
Feb. 4, 2005 (JP) .............................. 2005-029581

(51) Int. Cl.
*H04N 5/228* (2006.01)
(52) U.S. Cl. ............. 348/208.3; 348/208.4; 348/208.99
(58) Field of Classification Search ............ 348/208.99, 348/208.3, 208.4
See application file for complete search history.

(56) References Cited

U.S. PATENT DOCUMENTS

| | | | |
|---|---|---|---|
| 5,959,666 A | | 9/1999 | Naganuma |
| 6,343,188 B1* | | 1/2002 | Morofuji ............... 396/55 |
| 6,704,502 B2* | | 3/2004 | Morofuji ............... 396/55 |
| 6,734,902 B1* | | 5/2004 | Kawahara ............. 348/208.8 |
| 2002/0051635 A1* | | 5/2002 | Morofuji ............... 396/55 |
| 2004/0052513 A1 | | 3/2004 | Ohkawara et al. |

FOREIGN PATENT DOCUMENTS

| | | | |
|---|---|---|---|
| EP | 1 102 107 A3 | | 10/2001 |
| JP | 2001-142103 A | | 5/2001 |
| JP | 2002-229089 A | | 8/2002 |
| JP | 2003-107554 A | | 4/2003 |

* cited by examiner

*Primary Examiner*—James M Hannett
(74) *Attorney, Agent, or Firm*—Birch, Stewart, Kolasch & Birch, LLP (57) ABSTRACT

The present invention provides an image deflection correction apparatus that can securely detect that the pan/tilt operation is ended, and securely switch to a proper mode of image deflection correction. In the case where the mode of image deflection correction is changed (the image deflection correction is stopped) by judging that an optical system such as a camera is in the pan/tilt operation, if the positive direction integration value of integrating the absolute value of the difference between the value of a deflection signal and a reference value while the deflection signal outputted from a deflection detection device such as an angular velocity sensor is changed in the positive direction with respect to the reference value, and the negative direction integration value while it is changed in the negative direction, are matched, it is judged that the pan/tilt operation is ended, and the image deflection correction apparatus switches to the mode of image deflection correction where the pan/tilt operation is not active.

4 Claims, 6 Drawing Sheets

IMAGE DEFLECTION CORRECTION APPARATUS

BACKGROUND OF THE INVENTION

1. Field of the Invention

The present invention relates to an image deflection correction apparatus, and more particularly to an image deflection correction apparatus which corrects (prevents) an image deflection caused by the vibration in a camera.

2. Description of the Related Art

An image deflection correction apparatus of a television camera to correct an image deflection is well known in which a vibration proofing lens is arranged freely movably within a plane orthogonal to an optical axis in a photographing optical system, and if the vibration is applied to the camera (photographing optical system of the camera), the vibration proofing lens is driven by an actuator to cancel the image deflection (e.g., refer to Japanese Patent Application Laid-Open No. 2001-142103 and Japanese Patent Application Laid-Open No. 2003-107554). Also, other methods for correcting the image deflection are well known besides the method of employing the vibration proofing lens movable within the plane orthogonal to the optical axis. A correction amount of canceling the image deflection against the vibration applied to the camera (equivalent to a displacement amount of the vibration proofing lens if the vibration proofing lens is employed) is calculated, based on a deflection signal outputted from a deflection detection sensor such as an angular velocity sensor, by detecting the vibration applied to the camera with the deflection detection sensor.

Conventionally, a system has been offered for automatically judging whether or not the camera (optical system) is in the pan/tilt operation, based on a deflection signal obtained from the deflection detection sensor, in which the camera switches to a proper mode of image deflection correction where the pan/tilt operation is active, if it is judged that the camera is in the pan/tilt operation. For example, it has been proposed that if it is judged that the camera is in the pan/tilt operation, the image deflection correction is stopped (the efficacy of the image deflection correction is reduced) to resolve an unnatural screen caused by the image deflection correction in the pan/tilt operation or the bad operability due to the pan/tilt operation (e.g., refer to Japanese Patent Application Laid-Open No. 2002-229089). A judgment (pan/tilt judgment) whether or not the camera is in the pan/tilt operation is made depending on whether or not the magnitude of the deflection signal from the deflection detection sensor exceeds a prescribed threshold continually for a certain period of time or more, for example.

SUMMARY OF THE INVENTION

By the way, it is favorable to automatically judge that the pan/tilt operation is ended after stopping the image deflection correction if it is judged that the camera is in the pan/tilt operation, and automatically restart the image deflection correction, if it is judged that the pan/tilt operation is ended, because the labor of restarting the image deflection correction manually is saved. For instance, in Japanese Patent Application Laid-Open No. 2002-229089, after it is judged that the camera is in the pan/tilt operation, if the magnitude of the deflection signal from the deflection detection sensor is detected smaller than a prescribed threshold continually for a certain period of time or more, it is judged that the pan/tilt operation is ended, and the image deflection correction is restarted.

However, the vibration subject to the image deflection correction may occur in the camera, even when the cameraman actually ends the pan/tilt operation. For instance, this situation occurs easily, when the camera is set up in the place where there is vibration at any time such as an unstable place with a temporarily constructed tower or a concert hall. In that case, it is not likely to satisfy the end judgment condition that the size of the deflection signal is smaller than the prescribed threshold continually for the certain period of time or more, after the pan/tilt operation is actually ended. Therefore, there was nonconformity that the camera is in a state where the image deflection correction is stopped without restarting the image deflection correction, even if the actual pan/tilt operation is ended.

This invention has been achieved in the light of the above-mentioned problem, and it is an object of the invention to provide an image deflection apparatus that can securely detect that the pan/tilt operation is ended, and can securely switch to the mode of image deflection correction where the pan/tilt operation is not active when the pan/tilt operation is ended.

In order to accomplish the above object, according to a first aspect of the present invention, there is provided an image deflection correction apparatus comprising a deflection detection device which detects the vibration applied to an optical system and outputs a deflection signal according to the detected vibration, an integration value calculation device which sequentially calculates a positive direction integration value of integrating the absolute value of the difference between the value of the deflection signal and a reference value while the deflection signal outputted by the deflection detection device is continuously changed in a positive direction with respect to the reference value, and a negative direction integration value of integrating the absolute value of the difference between the value of the deflection signal and the reference value while the deflection signal is continuously changed in a negative direction with respect to the reference value, a determination device which determines whether or not the positive direction integration value and the negative direction integration value sequentially calculated by the integration value calculation device are matched, and an image deflection correction device which corrects an image deflection caused by the vibration applied to the optical system, based on the deflection signal outputted by the deflection detection device, and switches the mode of correction depending on whether the optical system is in a pan/tilt operation or not, in which in the mode of correction where the optical system is in the pan/tilt operation, if the determination device determines that the positive direction integration value and the negative direction integration value are matched, it is judged that the pan/tilt operation of the optical system is ended, and the mode of correction is switched into the mode where the optical system is not in the pan/tilt operation if it is judged that the pan/tilt operation is ended.

With this invention, when the pan/tilt operation is not active, it is detected that the pan/tilt operation is ended, employing the characteristic of deflection signal that the positive direction integration value and the negative direction integration value are matched of integrating the absolute value of the difference between the value of the deflection signal and the reference value while the deflection signal is changed continuously in the positive direction and the negative direction with respect to the reference value, whereby it is possible to securely detect that the pan/tilt operation is ended, and securely switch over to the mode of image deflection correction where the pan/tilt operation is not active if the pan/tilt operation is ended.

According to a second aspect of the invention, there is provided the image deflection correction apparatus, further comprising a second determination device which determines whether or not the absolute value of the difference between the value of the deflection signal outputted by the deflection detection device and the reference value is smaller than a prescribed threshold value continually for a certain period of time or more, in which the image deflection correction device judges that the pan/tilt operation of the optical system is ended, if the determination device determines that the positive direction integration value and the negative direction integration value are matched, or if the second determination device determines that the value of the deflection signal is smaller than the prescribed threshold value continually for the certain period of time or more.

With this invention, it is possible to detect that the pan/tilt operation is ended, employing the determination device and the second determination device, and thereby to detect more securely that the pan/tilt operation is ended.

According to a third aspect of the invention, there is provided the image deflection correction apparatus of the first or second aspect, further comprising a pan/tilt start determination device which determines whether or not the pan/tilt operation of the optical system is started based on the deflection signal outputted by the deflection detection device, in which the image deflection correction device switches over to the mode of correction where the optical system is in the pan/tilt operation, if the pan/tilt start determination device determines that the pan/tilt operation of the optical system is started in the mode of image deflection correction where the optical system is not in the pan/tilt operation. In this invention, the mode of image deflection correction is switched into the mode where the pan/tilt operation is active by detecting that the pan/tilt operation is started.

With the image deflection correction apparatus of the invention, it is possible to securely detect that the pan/tilt operation is ended, and securely switch over to the mode of image deflection correction where the pan/tilt operation is not active, when the pan/tilt operation is ended.

DETAILED DESCRIPTION OF THE PREFERRED EMBODIMENTS

The preferred embodiments of an image deflection correction apparatus according to the present invention will be described below in detail with reference to the accompanying drawings.

Figure 1:
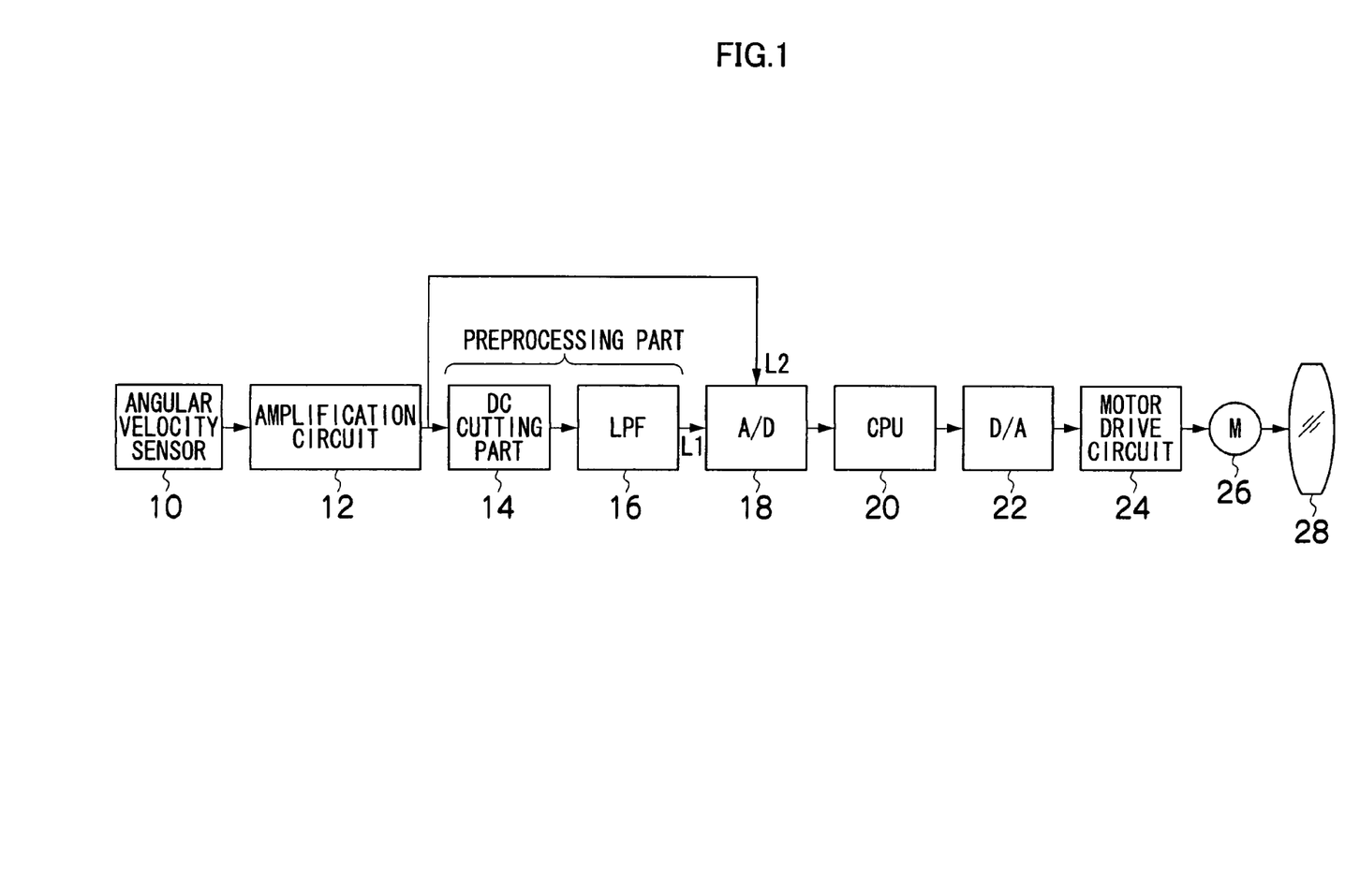
FIG. 1 is a block diagram showing the configuration of an image deflection correction apparatus according to the present invention.

FIG. 1 is a block diagram showing the configuration of an image deflection correction apparatus according to the invention. The image deflection correction apparatus is mounted on a lens unit (photographing lens) for a television camera, a movie camera, or a still camera. A vibration proofing lens 28 is arranged in an optical system for the lens unit or camera, on which this image deflection correction apparatus is mounted, to be movable to the left or right (horizontal direction) or up or down (vertical (perpendicular) direction) within a plane orthogonal to an optical axis of the optical system, as shown in FIG. 1. Also, the vibration proofing lens 28 is driven in the horizontal or vertical direction by a motor 26. When the vibration occurs in the camera (optical system), the vibration proofing lens 28 is moved to a position of correcting the image deflection (position of canceling the image deflection caused by the vibration) by the motor 26. Since the vibration proofing lens 28 is likewise driven against the vibration occurring in any of the horizontal and vertical directions, the configuration of making the image deflection correction in one direction (e.g., horizontal direction) is only shown in FIG. 1, and may be similarly made in the other direction.

In FIG. 1, an angular velocity sensor 10 is a gyro sensor for detecting the vibration of the optical system, and installed on an upper face of a lens barrel. From the angular velocity sensor 10, an electrical signal of voltage according to an angular velocity of vibration occurring in the horizontal direction of the optical system is outputted as an angular velocity signal.

The angular velocity signal outputted from the angular velocity sensor 10 is amplified by an amplification circuit 12, and has mainly the DC components (low frequency components of a predetermined cut-off frequency or less) cut off by a DC cutting part (high-pass filter (HPF)) 14, other frequency components passing through the DC cutting part 14. The angular velocity signal passing through the DC cutting part 14 is then inputted into a low-pass filter (LPF) 16. The LPF 16 cuts off the high frequency components not subjected to image deflection correction among the frequency components of the input angular velocity signal, and passes other frequency components through it. The angular velocity signal passing through the LPF 16 is converted into digital signal by an A/D converter 18, and inputted into a CPU 20. The angular velocity signal acquired by the CPU 20 through a preprocessing part consisting of the DC cutting part 14 and the LPF 16 is denoted as the angular velocity signal L1.

The CPU 20 makes an integration process for the angular velocity signal L1 inputted in the above way by making the arithmetical operation through a digital filter, and converts the angular velocity signal L1 into an angle signal. That is, the displacement amount of the vibration proofing lens 28 from the reference position to displace the image in a direction and a magnitude of canceling the image deflection caused by the vibration of the optical system (correction amount of canceling and correcting the image deflection) is obtained by making the integration process for the angular velocity signal L1. And the value of the correction amount (angle signal) acquired successively in the above way is outputted as the value indicating the movement target position of the vibration proofing lens 28.

The angle signal (correction amount) outputted from the CPU 20 is converted into analog signal by a D/A converter 22, and inputted into a motor drive circuit 24. The motor drive circuit 24 drives the motor 26 to move the vibration proofing lens 28, for example, in the horizontal direction to a position corresponding to the value of the angle signal outputted from the CPU 20. Thereby, the image deflection caused by the vibration applied to the optical system is corrected.

The image deflection correction method may be other than the method as shown in this embodiment. The method of this embodiment employs an image displacement device which intentionally displaces an image formation position of an image formed by the optical system in the horizontal or vertical direction within an image formation plane by displacing the vibration proofing lens 28, and corrects the image deflection by displacing the image to cancel the image deflection caused by the vibration applied to the optical system with the image displacement device. The image displacement device which intentionally displaces the image in this way may not employ the vibration proofing lens as in this embodiment, but may displace an image pickup element of the camera to displace a image pickup range of effectively picking up the image for recording or regeneration, and displace the image intentionally, or an electronic image displacement device for displacing a range of segmenting the image signal for recording or regeneration from the range of picked up image that is picked up by the image pickup element of the camera to displace the image intentionally. In this image deflection correction of other methods, the correction amount signal (equivalent to the angle signal) for displacing the image by the image displacement device in terms of the displacement amount required to cancel the image deflection in the same way as in this embodiment by making the integration process for the angular velocity signal acquired from the angular velocity sensor 10 can be also obtained.

On the other hand, the angular velocity signal outputted from the angular velocity sensor 10 and amplified by the amplification circuit 12 is passed through a signal line where required preprocessing is performed by the preprocessing part consisting of the DC cutting part 14 and the LPF 16 as described previously and inputted as the angular velocity signal L1 into the A/D converter 18, or passed through a signal line without the preprocessing directly coupled from the amplification circuit 12 to the A/D converter 18 and inputted into the A/D converter 18. This angular velocity signal is converted into digital signal by the A/D converter 18 and inputted in parallel to the angular velocity signal L1 into the CPU 20.

Thereby, the CPU 20 acquires the angular velocity signal for pan/tilt judgment not subjected to the preprocessing, in parallel to the angular velocity signal L1 subjected to the preprocessing for calculating the correction amount (angle signal). In the following, the angular velocity signal L1 subjected to the preprocessing by the preprocessing part is referred to as the correction amount calculation signal L1, and the angular velocity signal not subjected to the preprocessing that is acquired through the signal line directly coupled from the amplification circuit 12 to the A/D converter 20 is referred to as the pan/tilt judgment signal L2.

The pan/tilt judgment is to judge whether or not the optical system (camera) is in the pan/tilt operation. In this embodiment, the judgment as to whether or not the optical system is in the pan/tilt operation is made by the pan/tilt start judgment as to whether or not the pan/tilt operation is started and the pan/tilt end judgment as to whether or not the pan/tilt operation is ended. In the pan/tilt start judgment of this embodiment, it is judged that the pan/tilt operation is started if the magnitude (absolute value) of the difference between the value of the pan/tilt judgment signal L2 not subjected to the preprocessing and the reference value (central value) exceeds a prescribed threshold value $Ds_1$ continually for a certain period of time $t_1$, or otherwise, it is judged that the pan/tilt operation is not started. In the case where the angular velocity sensor 10 outputs the angular velocity signal for the vibration in the horizontal direction, the pan judgment (pan start judgment and pan end judgment) as to whether or not the panning operation is active is made, based on the pan/tilt judgment signal L2 acquired from the angular velocity sensor 10, or in the case where the angular velocity sensor 10 outputs the angular velocity signal for the vibration in the vertical (perpendicular) direction, the tilt judgment (tilt start judgment and tilt end judgment) as to whether or not the tilting operation is active is made, based on the pan/tilt judgment signal L2 acquired from the angular velocity sensor 10. In this embodiment, however, the pan/tilt judgment (pan/tilt start judgment and pan/tilt end judgment) is used in the meaning that the pan judgment or tilt judgment is made according to the vibration direction detected by the angular velocity sensor 10, regardless of whether the angular velocity sensor 10 detects the vibration in the horizontal or vertical direction.

The CPU 20 makes the pan/tilt start judgment, based on the pan/tilt judgment signal L2, and if it is judged that the camera is in the pan/tilt operation (the pan/tilt operation is started), a process for stopping the image deflection correction is performed. For example, the correction amount calculation signal L1 is substantially cut off by making the cut-off frequency of the DC cutting part (HPF) 14 higher than where the image deflection correction is effectively made. On the other hand, the correction amount is gradually decreased to zero by continually calculating the correction amount (angle signal), and the vibration proofing lens 28 is driven, based on its correction amount, so that the vibration proofing lens 28 is moved to the reference position and stopped. In this way, the nonconformity caused by the image deflection correction during the pan/tilt operation is prevented by stopping the image deflection correction during the pan/tilt operation. If it is judged that the pan/tilt operation is active, the image deflection correction may be stopped by other methods. Also, if it is judged that the pan/tilt operation is active, the image deflection correction is not fully stopped, but the efficacy of the image deflection correction may be reduced. If it is judged that the pan/tilt operation is active, the image deflection correction may be placed in any proper mode which is appropriate during the pan/tilt operation.

Also, the CPU 20 makes the pan/tilt end judgment as to whether or not the pan/tilt operation is ended, based on the pan/tilt judgment signal L2, as will be described later in detail, if it is judged that the pan/tilt operation is active, according to the pan/tilt start judgment. Thereby, if it is judged that the pan/tilt operation is ended, the normal image deflection correction when the pan/tilt operation is not active is restarted. As described above, when the image deflection correction is stopped by making the cut-off frequency of the DC cutting part 14 higher, the image deflection correction is restarted by restoring the cut-off frequency of the DC cutting part 14. Thereby, the image deflection correction is automatically restarted after the end of the pan/tilt operation without performing any special operation by the cameraman.

Figure 2:
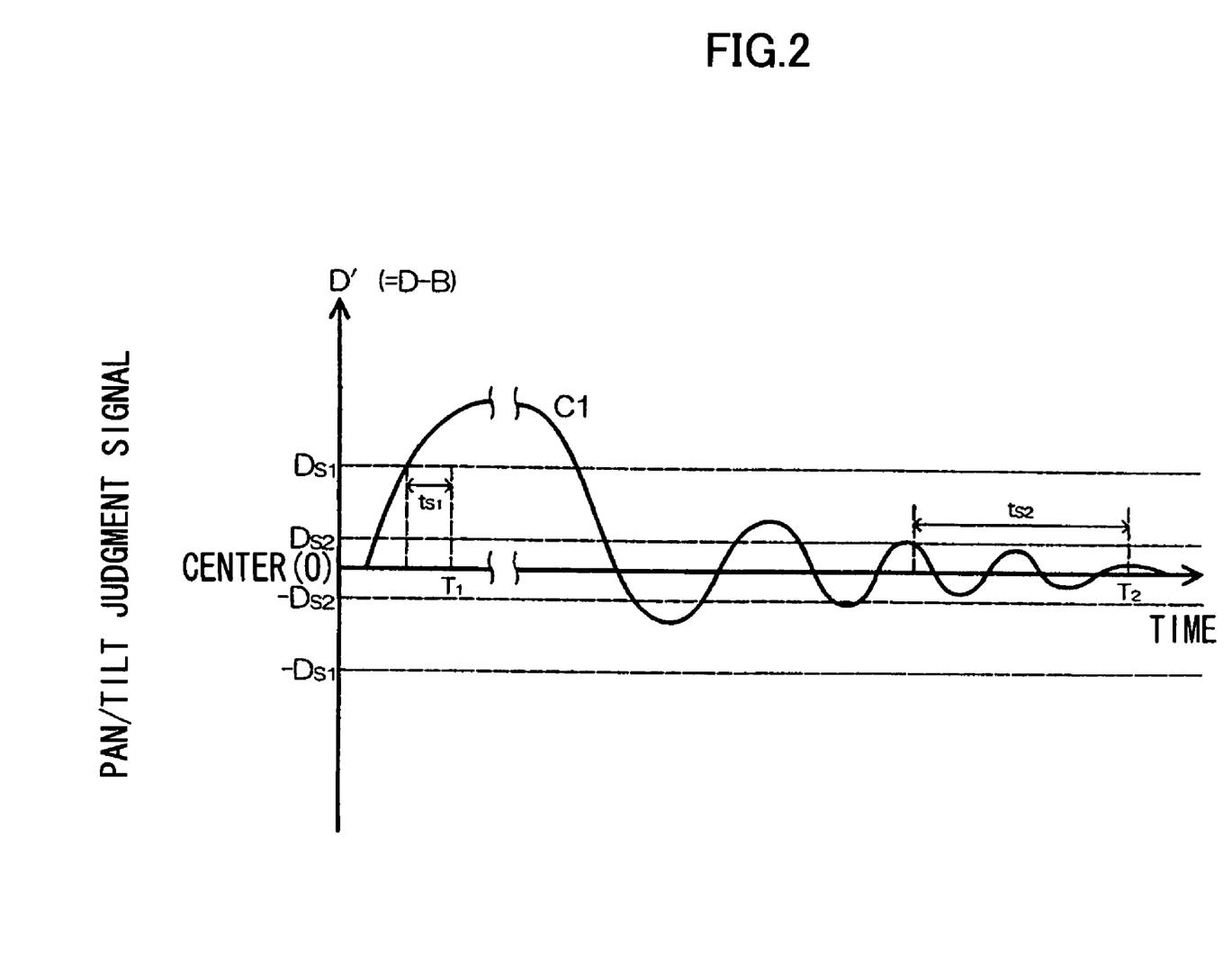
FIG. 2 is an explanatory view for explaining a pan/tilt end judgment as to whether or not the pan/tilt operation is ended.

The pan/tilt end judgment in the CPU 20 will be described below. The pan/tilt end judgment is made by judging that the pan/tilt operation is ended when at least one of the first determination condition and the second determination condition is satisfied. It is supposed that the pan/tilt judgment signal L2 having the waveform C1 of FIG. 2 is obtained by the pan/tilt operation. The pan/tilt judgment signal L2 does not become zero even when there is no vibration, because the DC components are not cut off by the DC cutting part 14, like the correction amount calculation signal L1. Therefore, the CPU 20 acquires in advance a value when there is no vibration by measurement, and stores the value as the reference value (central value) B. In FIG. 2, the longitudinal axis represents the value (D−B) (variation amount from the reference value B) in which the reference value B is subtracted from the value D of the pan/tilt judgment signal L2, as the value D' of the pan/tilt judgment signal L2, wherein the central value when there is no vibration is zero. The same thing holds in FIG. 3.

In FIG. 2, the pan/tilt operation is firstly started. If the magnitude (absolute value) |D−B| of the value D' of the pan/tilt judgment signal L2 exceeds a threshold value $Ds_1$ for the pan/tilt start judgment continually for a certain period of time $t_1$, the CPU 20 judges that the pan/tilt operation is started at the time $T_1$ of detecting it. Thereby, the CPU 20 performs a process for stopping the image deflection correction.

Then, the actual pan/tilt operation is ended. If the magnitude |D−B| of the value D' of the pan/tilt judgment signal L2 is less than a threshold value $Ds_2$ for the pan/tilt end judgment continually for a certain period of time $ts_2$, the CPU 20 judges that the pan/tilt operation is ended at the time T2 of detecting it. Thereby, the CPU 20 performs a process for restarting the image deflection correction.

That is, the CPU 20 judges that the pan/tilt operation is ended under the first determination condition that the magnitude |D−B| of the value D' of the pan/tilt judgment signal L2 is less than the prescribed threshold value $Ds_2$ for the pan/tilt end judgment continually for the certain period of time $ts_2$. It is preferred that the threshold value $Ds_2$ for the pan/tilt end judgment is smaller than the threshold value $Ds_1$ for the pan/tilt judgment, and the determination time $ts_2$ for the pan/tilt end judgment is greater than the determination time $ts_1$ for the pan/tilt judgment, as shown in FIG. 2.

Figure 3:
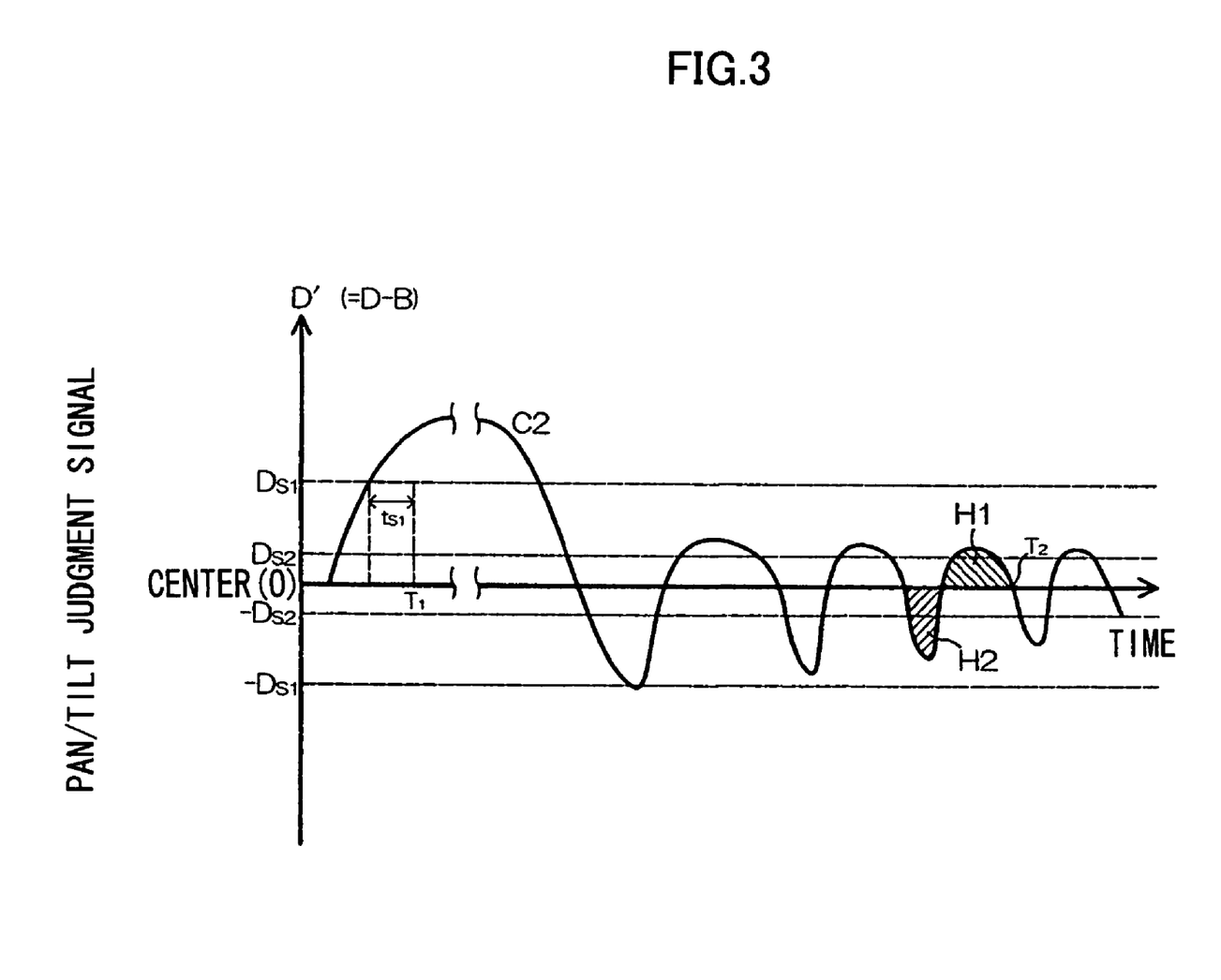
FIG. 3 is an explanatory view for explaining the pan/tilt end judgment as to whether or not the pan/tilt operation is ended.

On the other hand, it is assumed that the pan/tilt judgment signal L2 having the waveform C2 of FIG. 3 is obtained by the pan/tilt operation. The pan/tilt judgment signal L2 having the waveform C2 indicates that a relatively large vibration occurs during the pan/tilt operation, or immediately after the end of the pan/tilt operation, and in a peculiar case, the vibration is caused by applying an external force (tapping) in one vibration direction.

In FIG. 3, first of all, the pan/tilt operation is started in the same way as in FIG. 2. If the magnitude (absolute value) |D−B| of the value D' of the pan/tilt judgment signal L2 exceeds the threshold value $Ds_1$ for the pan/tilt start judgment continually for the certain period of time $ts_1$, the CPU 20 judges that the pan/tilt operation is active at the time $T_1$ of detecting it. Thereby, the CPU 20 performs the process for stopping the image deflection correction.

Subsequently, it is assumed that the actual pan/tilt operation is ended. In the waveform C2 in FIG. 3, even if the pan/tilt operation is ended, the magnitude |D−B| of the value D' of the pan/tilt judgment signal L2 exceeds the threshold value $Ds_2$ under the first determination condition as described in FIG. 2 before the certain period of time $ts_2$ passes, whereby it is not judged that the pan/tilt operation is ended under the first determination condition.

Thus, the integration value (integral value) of |D−B| from the time when the value D' of the pan/tilt judgment signal L2 is changed from a larger value (positive) to a smaller value (negative) than the central value (0), or from negative to positive, to the time when it is changed from negative to positive or from positive to negative is obtained. The integration value of |D−B| in a period for which the value D' of the pan/tilt judgment signal L2 is continuously changed in the positive direction with respect to the central value (0), namely, the value D of the pan/tilt judgment signal L2 is continuously changed in the positive direction with respect to the reference value B, is defined as the positive direction integration value X1. The integration value of |D−B| in a preceding or succeeding period for which the value D' of the pan/tilt judgment signal L2 is continuously changed in the negative direction with respect to the central value (0) is defined as X2. Under the second determination condition that the positive direction integration value X1 and the negative direction integration value X2 are almost matched, namely, the absolute value (|X1−X2|) of the difference between the positive direction integration value X1 and the negative direction integration value X2 is less than or equal to a prescribed threshold value Xs, it is judged that the pan/tilt operation is ended, if the second determination condition is satisfied.

This second determination condition is applied to the example of FIG. 3. Since the difference between the area (positive direction integration value) X1 of a region H1 where the value D' of the pan/tilt judgment signal L2 is continuously changed in the positive direction with respect to the central value (0) and the area (negative direction integration value) X2 of a region H2 where it is continuously changed in the negative direction with respect to the central value (0) is less than or equal to the threshold Xs in FIG. 3, it is judged that the pan/tilt operation is ended at the time T2 when the calculation of both the positive direction integration value X1 and the negative direction integration value X2 is ended. Thereby, the CPU 20 performs the process for restarting the image deflection correction. In this way, even if the value D' of the pan/tilt judgment signal L2 is not the vibration having the peculiar waveform as shown in FIG. 3, when the pan/tilt operation is ended, it is possible to detect that the pan/tilt operation is ended rapidly and securely by detecting that the positive direction integration value X1 in the period where the value is changed in the positive direction with respect to the central value (0) and the negative direction integration value X2 in the period where the value is changed in the negative direction with respect to the central value (0) are almost matched.

Figure 5:
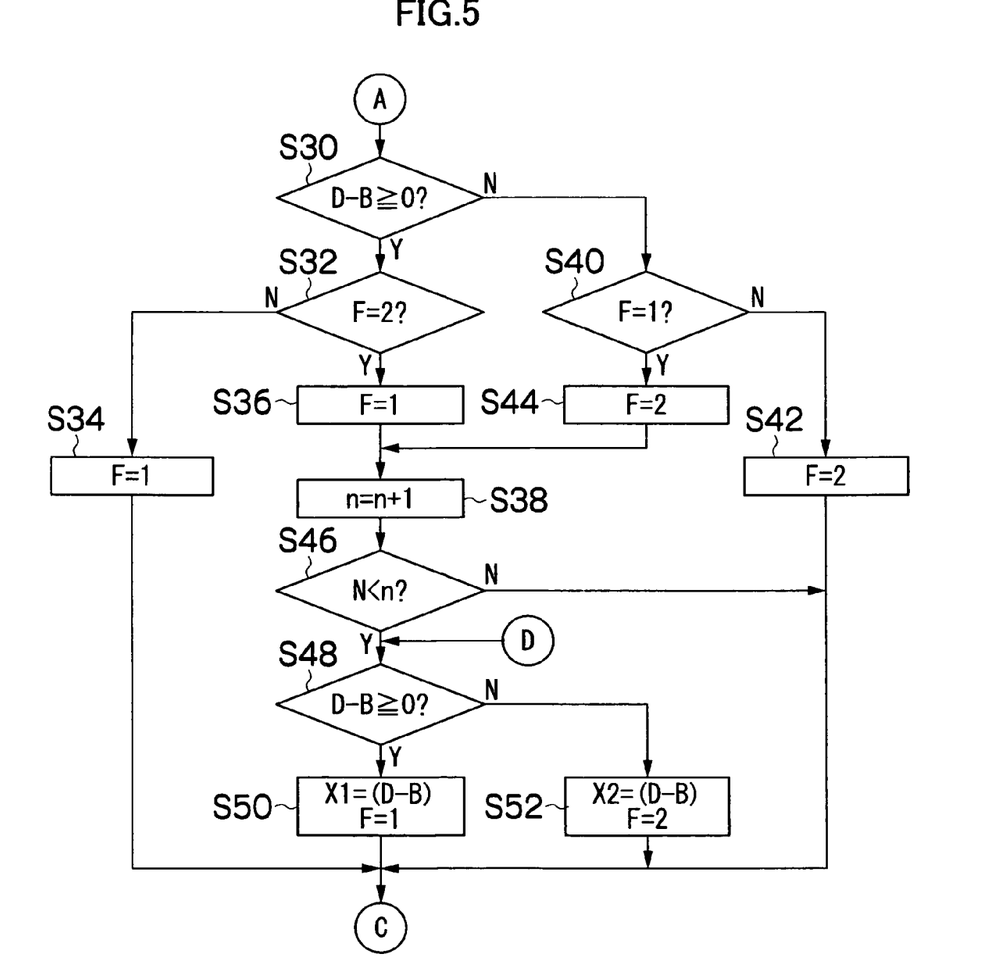
FIG. 5 is a flowchart showing the processing procedure of the pan/tilt end judgment in the CPU 20.
Figure 6:
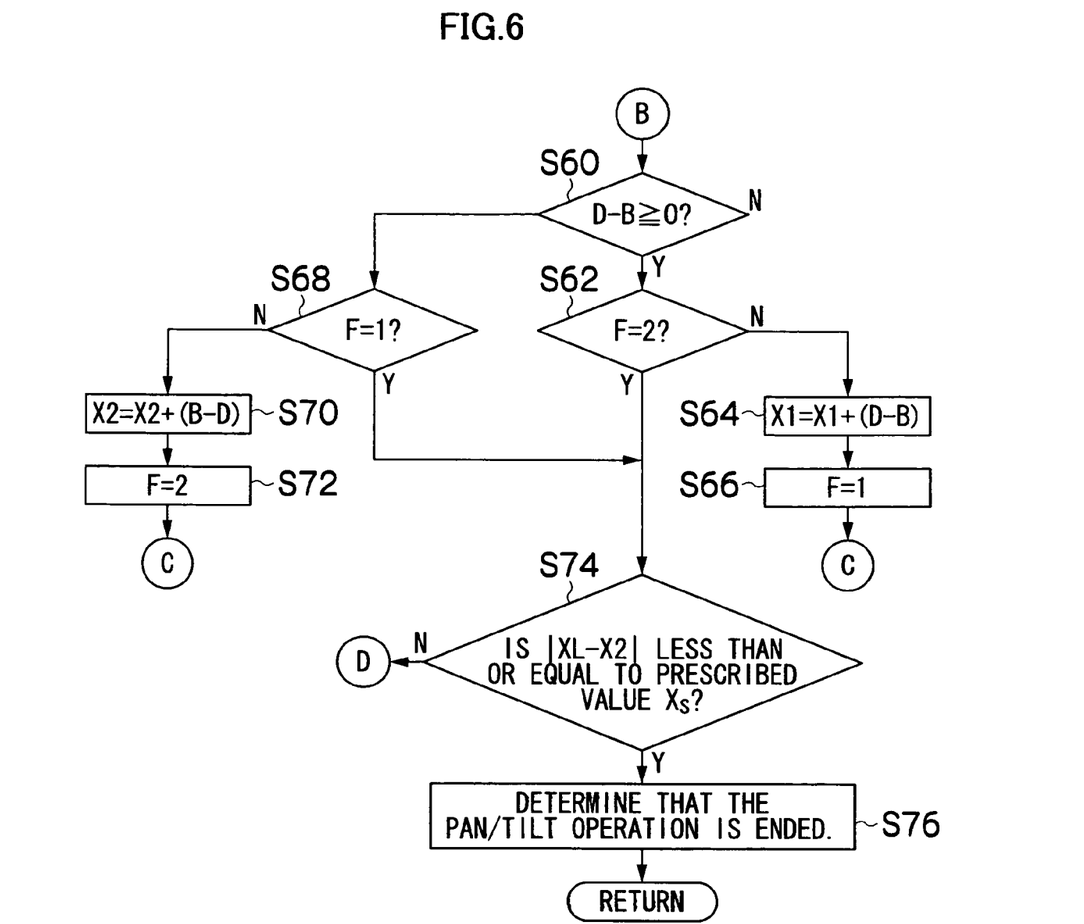
FIG. 6 is a flowchart showing the processing procedure of the pan/tilt end judgment in the CPU 20.

Referring to the flowcharts of FIGS. 4 to 6, a processing procedure of the pan/tilt end judgment in the CPU 20 will be described below. If the CPU 20 judges that the pan/tilt operation is started by the pan/tilt start judgment, first of all, various variables employed in the following are initialized (step S10) in FIG. 4. Then, the value of the pan/tilt judgment signal L2 is acquired, and set to the value of a variable D (step S12).

Then, it is determined whether or not the magnitude |D−B| of the difference D' (=D−B) between the value D of the pan/tilt judgment signal L2 and the reference value B is less than or equal to the threshold value $Ds_2$ under the first determination condition (step S14). If the determination is NO, the procedure goes to step S20 to make a determination process under the second determination condition.

If the determination at step S14 is YES, the time for which the determination is YES continuously since the determination at step S14 is YES for the first time, or the determination at step S14 is changed from NO to YES, is measured (step S16). And it is determined whether or not the time measured at step S16 exceeds the determination time $ts_2$ under the first determination condition (step S18). If the determination is NO, the procedure goes to step S20 to make the determination process under the second determination condition.

On the other hand, if the determination at step S18 is YES, it is determined that the pan/tilt operation is ended, because the first determination condition is satisfied (step S22). If it is determined that the pan/tilt operation is ended, the process of this flowchart is ended to make a process for restarting the image deflection correction in which the pan/tilt operation is not active.

If the determination at step S14 or step S18 is NO, the procedure goes to step S20 to make the determination process under the second determination condition, where it is firstly determined whether or not the variable n is greater than a predetermined value N.

Herein, the initial value of the variable n is 0. If the answer is NO in the determination process at step S20, and if the sign of the value D' (=D−B) of the pan/tilt judgment signal L2 is changed from positive to negative, the value of the variable n is incremented by 1 and the determination process at step S20 is repeated as will be described later. If the answer is NO in the determination process at step S20, the determination process under the second determination condition is not made. The determination process under the second determination condition is not made, till the sign of the value D' of the pan/tilt judgment signal L2 is changed N times. That is, after the pan/tilt operation is started, it is expected that the second determination condition is satisfied at least after the sign of the value D' of the pan/tilt judgment signal L2 is changed several times. Meanwhile, since the integration values X1 and X2 under the second determination condition are not calculated, the processing load is relieved. It is preferable that N is set to the value of about 1 to 5. This process in view of relieving the processing load is not necessarily required. If the determination at step S14 or S18 is NO, the procedure may directly transfer to the determination process under the second determination condition.

First of all, a case where the determination at step S20 is NO will be described below. In this case, the CPU 20 transfers to a process as shown in the flowchart of FIG. 5. Thus, first of all, it is determined whether or not the magnitude (absolute value) |D−B| of the value D' (the difference (D−B) between the value D of the pan/tilt judgment signal L2 and the reference value B) of the pan/tilt judgment signal L2 is greater than or equal to zero (step S30). If the determination is YES, it is determined whether or not a flag F is 2 (step S32). The flag F is set to 1 if the value D' of the pan/tilt judgment signal L2 at the time of previous determination is greater than or equal to zero, or to 2 if it is smaller than zero. If the determination at step S32 is NO, it is judged that the sign of the value D' of the pan/tilt judgment signal L2 is not changed. In this case, the flag F is set to 1 again (step S34), and the procedure returns to step S12 of FIG. 4.

If the determination at step S32 is YES, it is judged that the sign of the value D' of the pan/tilt judgment signal L2 is changed, in which the flag F is set to 1 (step S36), and the variable n is incremented by 1 (step S38). And the procedure goes to step S46.

On the other hand, if the determination at step S30 is NO, it is determined whether or not the flag F is 1 (step S40). If the determination is NO, it is judged that the sign of the value D' of the pan/tilt judgment signal L2 is not changed, and the flag F is set to 2 again (step S42). Then, the procedure returns to step S12 of FIG. 4.

If the determination at step S40 is YES, it is judged that the sign of the value D' of the pan/tilt judgment signal L2 is changed, in which the flag F is set to 2 (step S44), and the variable n is incremented by 1 (step S38). And the procedure goes to step S46.

At step S46, the CPU 20 determines whether or not the variable n is greater than N (step S46). N is equal to N as used at step S20 in FIG. 4. If the determination at step S46 is NO, namely, it is determined that the sign of the value D' of the pan/tilt judgment signal L2 is not changed more than N times, the procedure returns to step S12 of FIG. 4.

On the other hand, if the determination at step S46 is YES, namely, it is determined that the sign of the value D' of the pan/tilt judgment signal L2 is changed more than N times, the determination process under the second determination condition is started. Thus, first of all, it is determined whether or not the magnitude |D−B| of the value D' (=D−B) of the pan/tilt judgment signal L2 is greater than or equal to zero (step S48). If the determination is YES, |D−B| (=D−B) is substituted for the variable X1 indicating the positive direction integration value when the value D' of the pan/tilt judgment signal L2 is changed in the positive direction. Also, the flag F is set to 1 (step S50).

If the determination at step S48 is NO, |D−B| (=B−D) is substituted for the variable X2 indicating the negative direction integration value when the value D' of the pan/tilt judgment signal L2 is changed in the negative direction. Also, the flag F is set to 2 (step S52). And if step S50 or step S52 is ended, the procedure returns to step S12 of FIG. 4.

Figure 4:
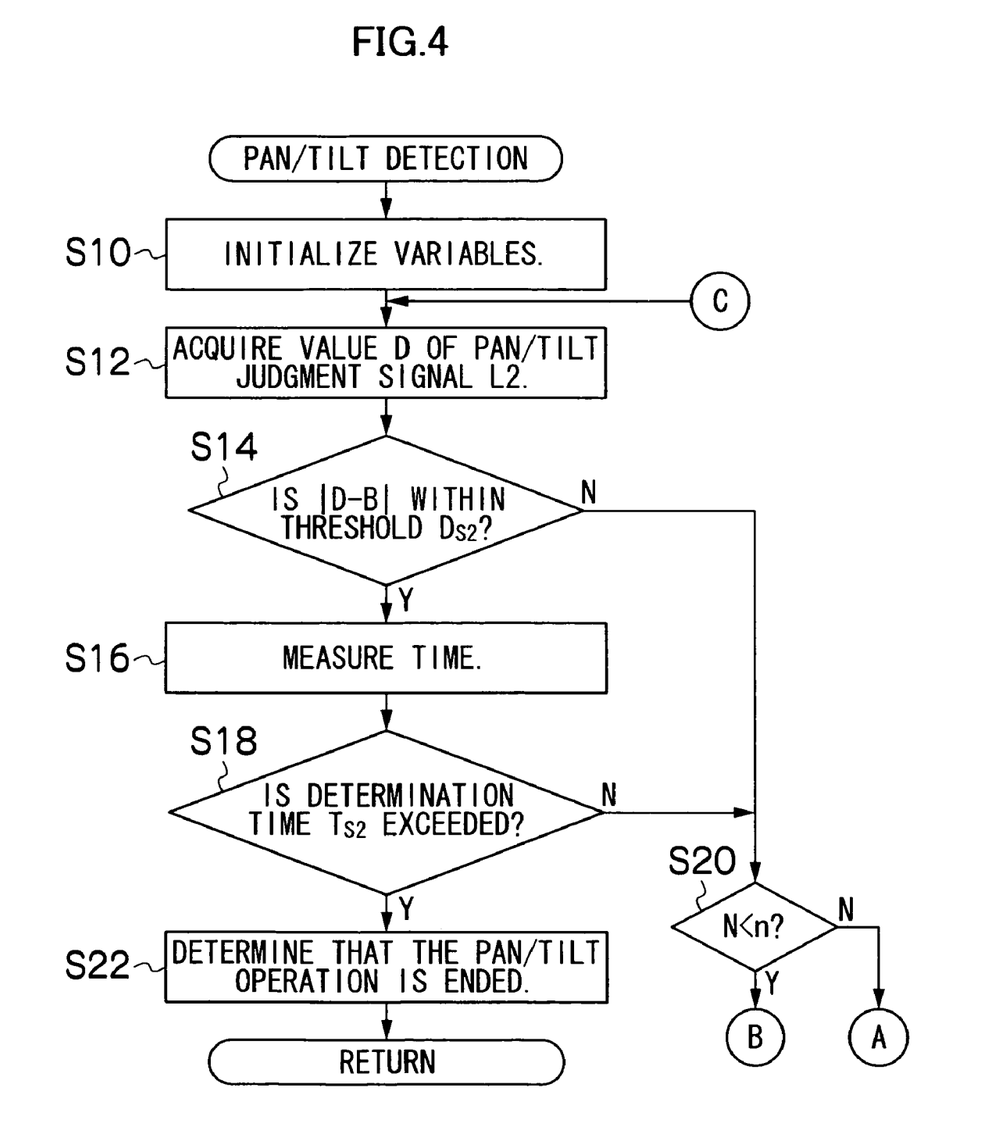
FIG. 4 is a flowchart showing a processing procedure of the pan/tilt end judgment in the CPU 20.

Next, a case where the determination at step S20 of FIG. 4 is YES will be described below. If the determination at step S46 is YES in the flowchart of FIG. 5 and the procedure returns to step S12 of FIG. 4, the determination at step S20 of FIG. 4 is YES. In this case, the CPU 20 transfers to a process as shown in the flowchart of FIG. 6. Thus, first of all, it is determined whether or not the magnitude |D−B| of the value D' (=D−B) of the pan/tilt judgment signal L2 is greater than or equal to zero (step S60). If the determination is YES, it is determined whether or not the flag F is equal to 2 (step S62). If the determination at step S62 is NO, it is judged that the sign of the value D' of the pan/tilt judgment signal L2 is not changed. In this case, |D−B| (=D−B) is added to the positive direction integration value X1 when the value D' of the pan/tilt judgment signal L2 is positive. That is, the following expression is calculated (step S64).

$$X1 = X1 + (D-B)$$

And the flag F is set to 1 again (step S66). The procedure returns to step S12 of FIG. 4.

If the determination at step S62 is YES, it is judged that the sign of the value D' of the pan/tilt judgment signal L2 is changed, in which the procedure goes to step S74.

If the determination at step S60 is NO, it is determined whether or not the flag F is 1 (step S68). If the determination at step S68 is NO, it is determined that the sign of the value D' of the pan/tilt judgment signal L2 is not changed. In this case, |D−B|(=B−D) is added to the negative direction integration value X2 when the value D' of the pan/tilt judgment signal L2 is negative. That is, the following expression is calculated (step S70).

$$X2 = X2 + (B-D)$$

And the flag F is set to 2 again (step S72). The procedure returns to step S12 of FIG. 4.

If the determination at step S68 is YES, it is judged that the sign of the value D' of the pan/tilt judgment signal L2 is changed, in which the procedure goes to step S74.

If the determination at step S62 or step S68 is YES, namely, it is determined that the sign of the value D' of the pan/tilt judgment signal L2 is changed, the procedure goes to step S74, where it is determined whether or not the absolute value |X1−X2| of the difference (X1−X2) between the positive direction integration value X1 and the negative direction integration value X2 is less than or equal to the prescribed threshold value Xs (step S74). If the determination is NO, it is not determined that the positive direction integration value X1 and the negative direction integration value X2 are almost matched, and the procedure goes to step S48 of FIG. 5. That is, the calculation process of the positive direction integration value X1 or the negative direction integration value X2 is newly started.

On the other hand, if the determination at step S74 is YES, it is determined that the pan/tilt operation is ended (step S76), because the second determination condition is satisfied. If it is determined that the pan/tilt operation is ended, the process of this flowchart is ended to perform a process for restarting the image deflection correction where the pan/tilt operation is not made.

In the embodiment as described above, the vibration applied to the optical system is detected by the angular velocity sensor, the correction amount is calculated, based on an angular velocity signal outputted from the angular velocity sensor, and the pan/tilt judgment is made. However, this invention may be also applicable to the form where the vibration applied to the optical system is detected by a deflection detection device other than the angular velocity sensor, for example, an angular acceleration sensor, an acceleration sensor, a speed sensor, an angular displacement sensor, or a displacement sensor, and the correction amount is calculated or the pan/tilt judgment is made based on a deflection signal outputted from the deflection detection device corresponding to the vibration.

Though in the above embodiment, the image deflection correction is stopped or the efficacy of the image deflection correction is reduced as the mode of image deflection correction when the pan/tilt operation is active, other modes of image deflection correction when the pan/tilt operation is active may be taken. The invention may be also applicable to a case where the mode of image deflection correction when the pan/tilt operation is active and the mode of image deflection correction when the pan/tilt operation is not active are switched.

Though in the above embodiment, it is determined that the pan/tilt operation is ended if any one of the first determination condition and the second determination condition is satisfied, the first determination condition may be other than that described in the embodiment, or it may be judged whether or not the pan/tilt operation is ended only based on the second determination condition.

What is claimed is:

1. An image deflection correction apparatus comprising:
    a deflection detection device which detects a vibration applied to an optical system and outputs a deflection signal according to the detected vibration;
    an integration value calculation device which sequentially calculates a positive direction integration value of integrating an absolute value of a difference between the value of the deflection signal and a reference value while the deflection signal outputted by the deflection detection device is continuously changed in a positive direction with respect to the reference value, and a negative direction integration value of integrating the absolute value of the difference between the value of the deflection signal and the reference value while the deflection signal is continuously changed in a negative direction with respect to the reference value;
    a determination device which determines whether or not the positive direction integration value and the negative direction integration value sequentially calculated by the integration value calculation device are matched; and
    an image deflection correction device which corrects an image deflection caused by the vibration applied to the optical system, based on the deflection signal outputted by the deflection detection device, and switches a mode of correction depending on whether the optical system is in a pan/tilt operation or not, in which in the mode of correction where the optical system is in the pan/tilt operation, if the determination device determines that the positive direction integration value and the negative direction integration value are matched, it is judged that the pan/tilt operation of the optical system is ended, and the mode of correction is switched into the mode where the optical system is not in the pan/tilt operation if it is judged that the pan/tilt operation is ended.

2. The image deflection correction apparatus according to claim 1, further comprising:
    a second determination device which determines whether or not the absolute value of the difference between the value of the deflection signal outputted by the deflection detection device and the reference value is smaller than a prescribed threshold value continually for a certain period of time or more,
    wherein the image deflection correction device judges that the pan/tilt operation of the optical system is ended, if the determination device according to claim 1 determines that the positive direction integration value and the negative direction integration value are matched, or if the second determination device determines that the value of the deflection signal is smaller than the prescribed threshold value continually for the certain period of time or more.

3. The image deflection correction apparatus according to claim 1, further comprising:
    a pan/tilt start determination device which determines whether or not the pan/tilt operation of the optical system is started based on the deflection signal outputted by the deflection detection device,
    wherein the image deflection correction device switches over to the mode of correction where the optical system is in the pan/tilt operation, if the pan/tilt start determination device determines that the pan/tilt operation of the optical system is started in the mode of image deflection correction where the optical system is not in the pan/tilt operation.

4. The image deflection correction apparatus according to claim 2, further comprising:
    a pan/tilt start determination device which determines whether or not the pan/tilt operation of the optical system is started based on the deflection signal outputted by the deflection detection device,
    wherein the image deflection correction device switches over to the mode of correction where the optical system is in the pan/tilt operation, if the pan/tilt start determination device determines that the pan/tilt operation of the optical system is started in the mode of image deflection correction where the optical system is not in the pan/tilt operation.

* * * * *